United States Patent [19]
Fremstad

[11] Patent Number: 5,799,430
[45] Date of Patent: Sep. 1, 1998

[54] UNIFIED APPARATUS FOR FORMING A FRAME CORNER

[76] Inventor: Greg Fremstad, 5120 Franklin Blvd. #5, Eugene, Oreg. 97403

[21] Appl. No.: 724,225

[22] Filed: Oct. 2, 1996

Related U.S. Application Data

[63] Continuation of Ser. No. 300,382, Sep. 2, 1994, abandoned.

[51] Int. Cl.⁶ ............................................. G09F 1/12
[52] U.S. Cl. .................... 40/785; 40/782; 403/401; 403/402; 403/403
[58] Field of Search ........................ 40/780, 782, 784, 40/785; 403/401, 402, 403

[56] References Cited

U.S. PATENT DOCUMENTS

| | | |
|---|---|---|
| 2,538,138 | 1/1951 | Webster . |
| 3,782,054 | 1/1974 | Goss, Jr. . |
| 3,784,150 | 1/1974 | Kulicke . |
| 3,965,601 | 6/1976 | Nielsen . |
| 4,122,617 | 10/1978 | Nielsen . |
| 4,377,915 | 3/1983 | Zossimas et al. ............... 40/155 |
| 4,385,744 | 5/1983 | Sherman . |
| 4,499,679 | 2/1985 | Sherman . |
| 4,516,341 | 5/1985 | Jenkins . |
| 4,559,733 | 12/1985 | Forslund . |
| 4,659,270 | 4/1987 | Herb . |
| 4,694,598 | 9/1987 | Eisenloeffel ..................... 40/155 |
| 4,709,495 | 12/1987 | Buckwalter . |
| 4,862,612 | 9/1989 | Sugihara et al. . |
| 4,929,114 | 5/1990 | Young . |
| 5,007,189 | 4/1991 | Buckwalter . |
| 5,010,708 | 4/1991 | Evans et al. . |

FOREIGN PATENT DOCUMENTS

| | | | |
|---|---|---|---|
| 1168445 | 6/1984 | Canada | ......................... 40/155 |

*Primary Examiner*—Brian K. Green
*Attorney, Agent, or Firm*—Marger, Johnson, McCollom & Stolowitz, PC

[57] ABSTRACT

A one-piece frame corner joining apparatus for joining two picture frame members at a predetermined angle to form a frame corner. The frame members are preferably standard aluminum frames having a longitudinal channel for receiving corner hardware. The joining apparatus includes first and second legs disposed at the predetermined angle relative to each other, each leg receivable in a corresponding frame member channel. Each leg includes a top side and a bottom side, a bore, a screw received in the bore, and a tab portion connected to the bottom side of the leg. The tab portion is formed of a strip of the leg that is bent back over the bore and spaced apart from the leg such that the screw, when tightened, deflects the tab downward to frictionally engage the leg with the corresponding frame member channel.

11 Claims, 2 Drawing Sheets

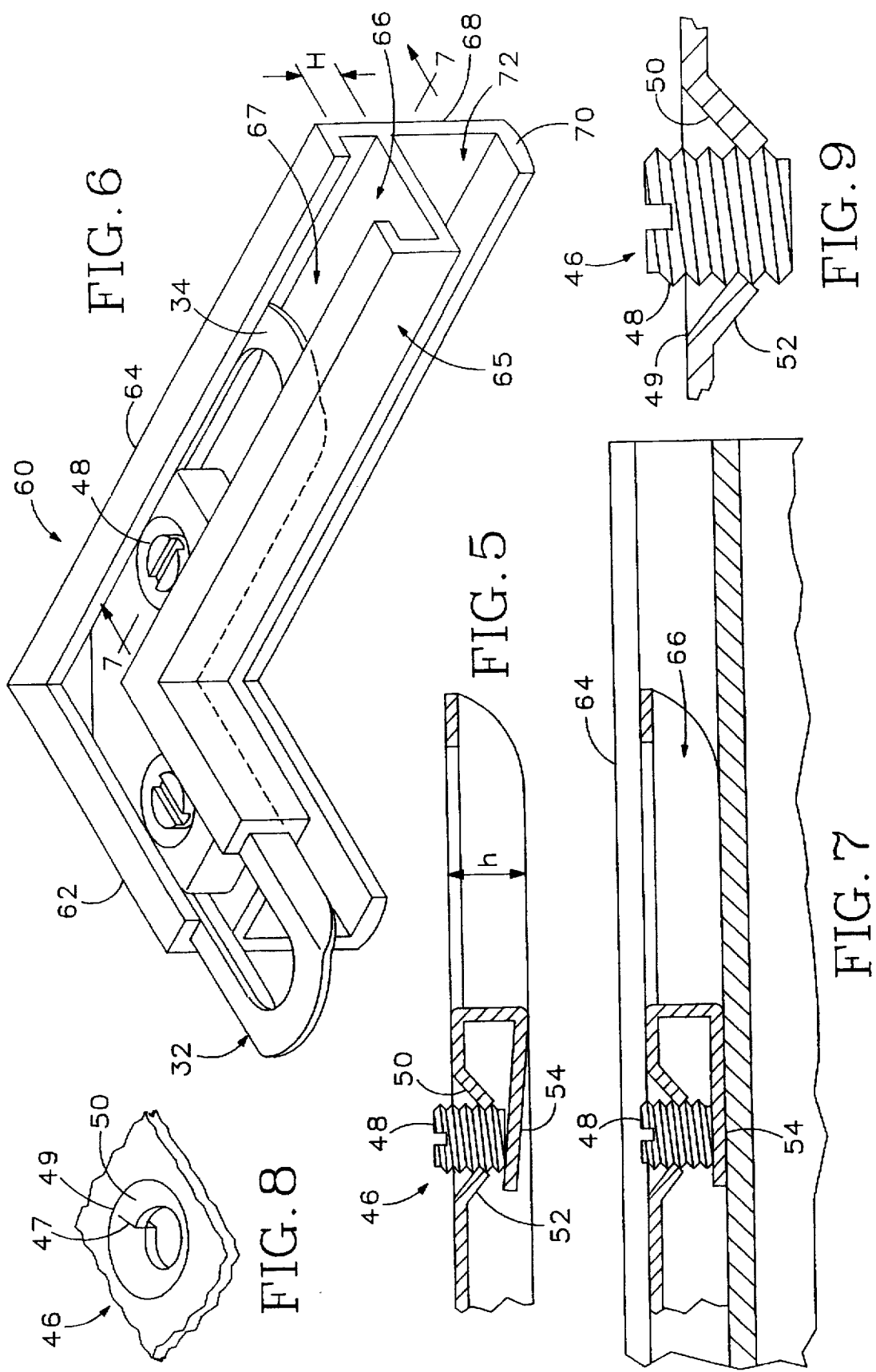

5,799,430

UNIFIED APPARATUS FOR FORMING A FRAME CORNER

This is a Continuation under the file wrapper continuation procedure set forth in 37 CFR 1.62, of application Ser. No. 08/300,382 filed Sep. 2, 1994, now abandoned.

BACKGROUND OF THE INVENTION

This invention relates generally to metal sectional picture frames and more particularly to apparatus for joining such picture frames.

Referring to FIG. 1, a perspective view of a prior art one-piece picture frame corner hardware is shown generally at 10. A frame corner having the corner hardware installed is shown in FIG. 2. The frame corner is representative of all four corners of the corresponding picture frame. The frame is a typical aluminum picture frame that includes four metal frame members, each having a mitred end to allow the pieces to be brought together in an abutting relationship to form a 90° corner. Each frame member has a longitudinal channel formed therealong for receiving the corner hardware.

The corner hardware 10 includes two legs 12 and 14 disposed at the same angles as the frame members when joined. The legs have a height slightly less than the height of the channel to allow the legs to be easily inserted therein. The legs 12 and 14 further include holding screws 16 and 18, respectively. The screws are received in tapped holes formed on the legs. The frame members have a longitudinal opening, formed on a backside of the member, to provide access to the screw when the leg is received in the frame member as shown in FIG. 2.

The frame members are joined by inserting the legs in the respective frame members and thereafter tightening down the retaining screws. A problem with this approach, however, is that the screws deform the frame member when the screw is tightened down sufficiently to join the frame members. These deformations or "dimples" are not only unsightly but they further prevent the frame members from being realigned because the screws thereafter always center themselves in the dimples.

One approach to prevent the dimpling is to provide a second thin backing plate opposite the screws. The backing plate (not shown) distributes the downward force of the screw along the frame member to prevent the frame member from being deformed. This so-called two-piece or "Neilsen" style corner hardware is effective in substantially eliminating the dimples. As a result, the Neilsen style corner hardware has become a standard in the framing industry.

The Neilsen style corner hardware, however, is more time consuming to install than the one-piece hardware described above. In addition, both the one-piece and two-piece hardware suffer from an additional problem. During shipping the screws held in the legs have a tendency to vibrate in or out of the holes. Often the screws will work their way completely out of the leg holes. This necessitates additional labor to either back out the screws to get the legs into the frame or to turn the screws numerous times to install them in the frame members.

Accordingly, a need remains for a one-piece metal frame joining means that does not suffer from the above described disadvantages.

SUMMARY OF THE INVENTION

It is therefore an object of the invention to provide a one-piece joining means that does not dimple the frame members.

The present invention comprises first and second legs disposed at a predetermined angle relative to each other, each leg being receivable in a corresponding frame member channel. The legs include a bore formed therein for receiving a screw and a tab portion connected to a bottom side of the leg. The tab portion is spaced apart from the leg and extends over the bore such that the screw when tightened deflects the tab downward to frictionally engage the leg with the corresponding frame member channel. The tab portion, therefore, prevents the screw from dimpling the frame member.

The tab portion, in the preferred embodiment, is formed from a portion of the corresponding leg. The outline of the tab is cut out and the tab is then bent back upon the leg so that the tab portion extends over the bore. Thus, a single piece of metal can be used to form the complete joining means.

An advantage of the present invention is the minimal amount of material required for the joining means.

Another advantage of the present invention is that the screws are maintained in the legs during shipping.

A further advantage of the present invention is that fewer turns of the screws are required to join the frame members together.

A further advantage of the present invention is the elimination of the tapping step.

A yet further advantage of the present invention is the increased resistance to torsional movement of the frame caused by the weight of the glass, art, and backing held therein.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 5 is a cross-sectional view of the frame joining means of FIG. 3 taken along line 5—5.

FIG. 6 is a cutaway perspective view of two frame members joined together by the frame joining means of FIG. 3 to form a frame corner.

FIG. 7 is a cross-sectional view of the frame corner of FIG. 6 taken along line 7—7 showing the tab frictionally engaged with the frame channel.

FIG. 8 is a perspective view of the bore of FIGS. 3 and 4 having a simulated helical thread formed in the leg for receiving the screw.

FIG. 9 is a cross-sectional view of the bore of FIG. 8 having a the screw held therein by the simulated helical thread.

DETAILED DESCRIPTION

Figure 1:
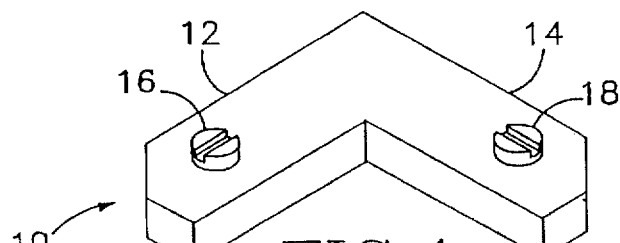
FIG. 1 is a perspective view of a prior art one-piece frame cornerpiece.
Figure 2:
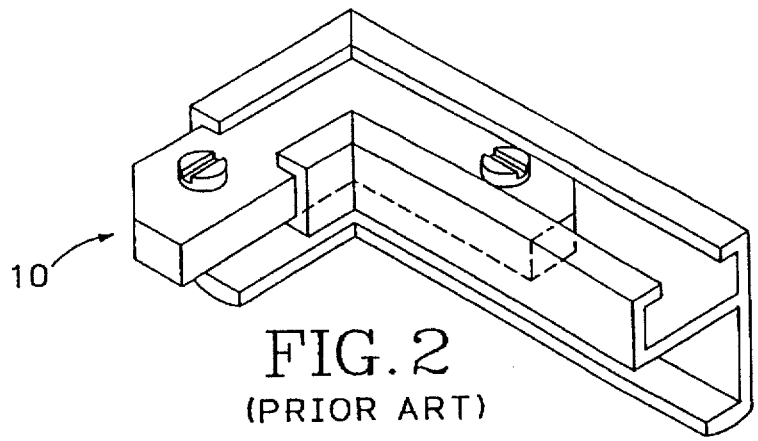
FIG. 2 is a cutaway perspective view of two frame members held together by the cornerpiece of FIG. 1 to form a frame corner.
Figure 3:
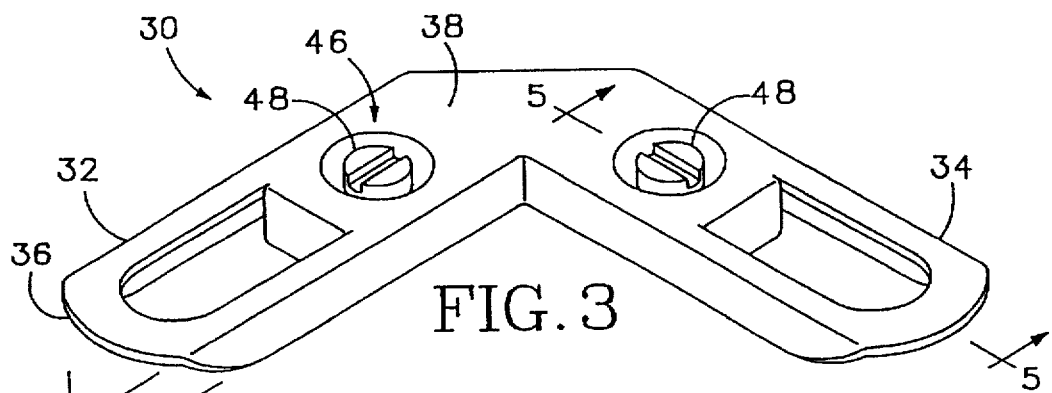
FIG. 3 is a top perspective view of a one-piece frame joining means according to the invention.
Figure 4:
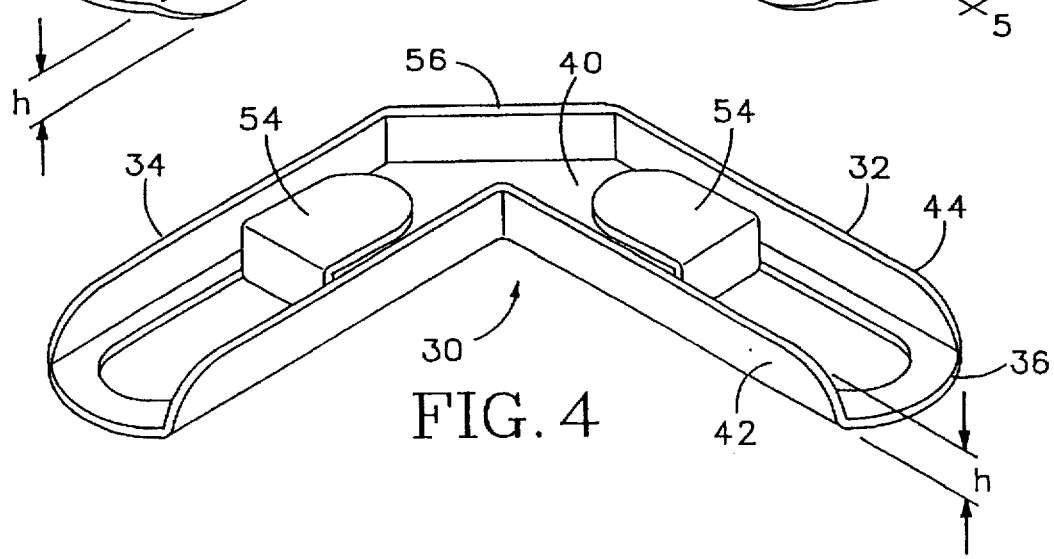
FIG. 4 is a bottom perspective view of the joining means of FIG. 3.

Referring now to FIGS. 3 and 4, a one-piece frame member joining device 30 according to the invention is shown. The joining device includes legs 32 and 34 which are substantially identical. The two legs are joined together at a predetermined angle corresponding to a desired frame corner angle. The two legs 32 and 34 are disposed at a 90° angle in FIGS. 3 and 4, but the legs can be disposed at any relative angle, e.g., 135° depending on the desired frame configuration, e.g., octagon.

Leg 32 includes an elongate member 36 having a top side 38 and a bottom side 40. Connected to the bottom side 40 of the elongate member 36 are first and second side wall members 42 and 44, respectively. The side wall members 42 and 44 have a height "h" slightly less than the height "H" of the corresponding frame member channel, as shown in FIG. 6. One standard channel height is 0.205 inches±0.010 inches; the preferred embodiment is sized for this height. The height of the side wall members can therefore be varied to correspond to the height of any frame channel.

Leg 32 further includes a bore shown generally at 46 for receiving a screw 48 held therein. In one embodiment, the bore is a hole punched out of the leg member and thereafter tapped to receive the threads of the screw 48. In a second, preferred embodiment, as shown in FIGS. 8 and 9, a slit 47 is formed in the leg and one side of the slit is depressed at a first angle and the other side is depressed at a second angle greater than the first. This causes the bore to form a helical simulated thread that follows the contour of the screw thread. The difference between the first and second angles of depression is determined by the pitch of the screw. The second angle is greater than the first such that the distal ends of the opposite sides of the slit are offset by the thread pitch. A line 49 indicates the top edge of a dimple formed in the leg by the stamp used to form the simulated thread. The dimple also acts as a countersink for the screw when received in the bore 46.

In the preferred embodiment, the simulated thread is formed to match the specifications of a 10–24 coarse thread screw. The thread specifications are listed below in Table 1.

TABLE 1

| Specifications for a 10–24 coarse thread screw. | |
| --- | --- |
| Major Diameter | 0.19000 inch |
| Minor Diameter | 0.13890 inch |
| Pitch Diameter | 0.16290 inch |
| Pitch | 0.04167 inch |

The bore 46 is shown in FIG. 9 with the screw 48 held therein by the helical simulated thread formed to match the above specifications.

The leg 32 further includes a tab portion 54 connected to the bottom side of the leg and spaced apart therefrom and extending over the bore 46 such that the screw 48, when tightened, deflects the tab downward to frictionally engage the leg 32 with the corresponding frame member channel. In the preferred embodiment, the tab is formed of a portion of the leg that is separated from the leg and bent back over the bore as shown in FIG. 5. Thus, the tab prevents the screw from dimpling the frame member because the screw contacts the tab 54 instead of the frame channel. Although the tab portion 54 shown in FIG. 5 includes a rounded distal end, the invention is not limited to the tab design shown. For example, the tab can be substantially rectangular depending on the manufacturing process and the frame dimensions.

The tab 54, as shown in FIG. 5, is inclined slightly towards the elongate member in its normal bias state to allow for easy insertion of the leg into the corresponding frame member channel. The slight inclination of the tab also allows the screw 48 to be inserted in the bore substantially all the way which, thus, requires only a partial turn to frictionally engage the leg in the frame channel. The tab bias exerts a retaining force on the screw to retain the screw 48 in the bore 46 during shipping. Thus, the tab bias prevents the screws from working their way out during shipping.

The frame joining device 30 further includes a cross-member 56 connected between the second side wall members of the two legs 32 and 34. The cross member 56 resists torsional movement of the legs such as that caused by the weight of a glass held in the frame. Preferably, the second side wall members of the two legs 32 and 34 could be extended to meet at the corner to increase the material in the cross section for added torsional strength.

The above-described joining device 30 is preferably made of steel. The joining device 30 can be manufactured by a process of successive die stamping. In this process a flat piece of steel starts at one end and moves through four or five stations where different cutting and forming steps are performed. One such step, e.g., is the above-described bore forming step. The other necessary steps are known in the art of sheet metal working given the drawings and description herein.

Referring now to FIG. 6, a cut-away perspective view of a picture frame corner is shown generally at 60. The corner 60 is representative of all of the corners of the corresponding frame. Only the single frame corner 60 is shown for illustrative purposes. The frame corner includes two frame members 62 and 64 each having a mitred end to allow the members 62 and 64 to be placed in an abutting relation, as shown in FIG. 6 to form a corner.

The frame members are, in the preferred embodiment, made of aluminum and are substantially identical, except for the mitred end. Therefore, only frame member 64 will be described in detail. Frame member 64 includes a tubular member 65 having a a longitudinal channel shown generally at 66 formed therein. The longitudinal channel 66 is adapted to receive the leg 34 of the joining device 30. The tubular member 65 further includes a longitudinal opening, shown generally at 67, to provide access to the screw 48 when the leg 34 is received in the longitudinal channel 66. The frame member 64 further includes an L-shaped member 68 connected to the tubular member on a side opposite the longitudinal opening. The L-shaped member 68 includes a distal lip 70 running therealong for retaining a picture and a sheet of glass (not shown) in a space 72 between the tubular member 65 and the distal lip 70.

In use, each leg of the joining device 30 is inserted into the longitudinal channels of two adjacent frame member. For example, in FIG. 6, leg 34 is received in longitudinal channel 66 of corresponding frame member 64. Once the legs are received in the longitudinal channels of the respective corresponding frame members, the mitred ends of the channel members are placed in an abutting relation, as shown in FIG. 6. Next, the screws held in the legs, e.g., screw 48, are tightened so that the screw deflects the tab in the corresponding leg causing the tab to thereby frictionally engage in the corresponding longitudinal channel. For example, as shown in FIG. 7, screw 48 deflects tab 54 thereby causing tab 54 to frictionally engage the longitudinal channel 66.

Having described and illustrated the principles of the invention in a preferred embodiment thereof, it should be apparent that the invention can be modified in arrangement and detail without departing from such principles.

I claim all modifications and variation coming within the spirit and scope of the following claims:

1. A picture frame comprising:

a plurality of frame members having first and second channels formed therein between a pair of opposing ends of the frame members, the first channel being adapted to receive a picture and a sheet of glass, the second channel being adapted to receive a joining means and including a base, a pair of side members connected thereto and a pair of opposed upper lips extending inwardly from the side members, the ends of the frame members being mitred to form a continuous frame when the mitred ends of the frame members are placed in abutting relation; and a plurality of joining means including:

first and second legs disposed at a predetermined angle relative to each other and having longitudinal axes which intersect at the predetermined angle, each leg received in the second channel of the frame members and including:

a tab portion of the first leg connected to the first leg by a fold line, said fold line being transverse to the longitudinal axis of the first leg;

a tab portion of the second leg connected to the second leg by a fold line, said fold line being transverse to the longitudinal axis of the second leg, wherein the tab portion of each leg includes a strip of the leg forming a tab, the tab being bent back over the leg such that the tab is spaced apart from the leg and extends at a slightly inclined angle relative to the longitudinal axis of the leg; and means for expanding the tab portions of the leg into frictional engagement with the base of the second channel when the leg is received therein.

2. A picture frame according to claim 1 wherein the means for expanding the tab portion of each leg includes:

a bore formed in the leg; and a screw received in the bore for deflecting the tab portion to frictionally engage the leg in the corresponding frame member channel responsive to tightening the screw.

3. A picture frame according to claim 2 wherein the legs further include:

a top member; and first and second sidewall members connected at opposite lateral ends of the top member.

4. A picture frame according to claim 3 further including means connected between the legs for resisting torsional movement of the legs.

5. A picture frame according to claim 4 wherein means for resisting torsional movement of the legs includes a cross member connected between the second sidewall members of the first and second legs at a second predetermined angle to the second sidewall members.

6. A picture frame according to claim 1 wherein there are four joining means and wherein the respective legs of each joining means are disposed at a 90° angle.

7. A picture frame according to claim 1 wherein the frame members are made of aluminum.

8. An apparatus for joining two frame members of a type having channels formed therein at a predetermined angle to form a frame corner, said apparatus comprising:

a first leg receivable in such a frame member channel;

a second leg receivable in such a frame member channel; and means for disposing the first and second legs at the predetermined angle relative to each other, said legs having longitudinal axes which intersect at the predetermined angle and each including:

a tab portion of the first leg connected to the first leg by a fold line, said fold line being transverse to the longitudinal axis of the first leg;

a tap portion of the second leg connected to the second leg by a fold line, said fold line being transverse to the longitudinal axis of the second leg;

means for expanding the tab portion thereof to be frictionally engageable with an associated frame member channel when the leg is received therein; and a strip of the leg forming a tab, the tab being bent back over the leg such that the tab is spaced apart from the leg and extends at a slightly inclined angle relative to the longitudinal axis of the leg.

9. An apparatus according to claim 8 wherein the means for expanding the tab portion of each leg includes:

a bore formed in the leg; and a screw received in the bore such that the tab portion of the leg expands away from the leg responsive to the screw being tightened, said screw being retained in said bore by said tab portion.

10. An apparatus according to claim 8 wherein the means for disposing the first and second legs includes a cross member connected between the first and second legs to resist torsional movement of the legs.

11. An apparatus according to claim 8, the first and second legs further including:

an elongate top member;

a rounded distal end; and first and second sidewall members connected at opposite lateral ends of the top member, the sidewall members being tapered towards the distal end to be easily insertable into such a frame member channel.

* * * * *